Figure 1:
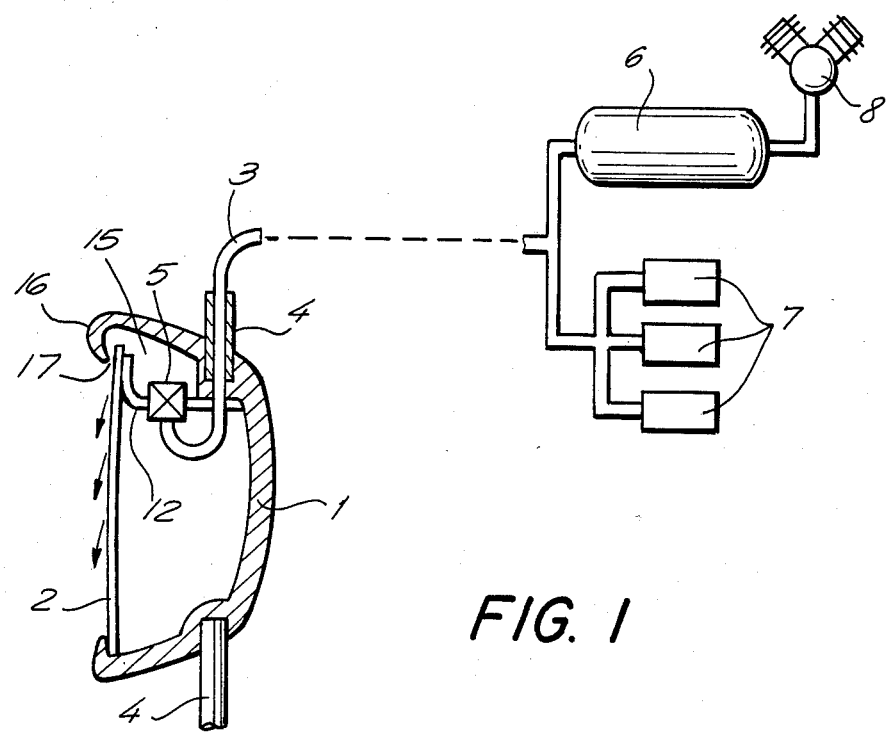

United States Patent [19]

Japes

[11] Patent Number: 4,561,732
[45] Date of Patent: Dec. 31, 1985

[54] DRIVING MIRROR FOR MOTOR VEHICLES

[75] Inventor: Manfred Japes, Ginsheim-Gustavsburg, Fed. Rep. of Germany

[73] Assignee: MAN Maschinenfabrik Augsburg-Nurnberg AG, Munich, Fed. Rep. of Germany

[21] Appl. No.: 527,968

[22] Filed: Aug. 31, 1983

[30] Foreign Application Priority Data

Sep. 21, 1982 [DE] Fed. Rep. of Germany ....... 3234843

[51] Int. Cl.$^4$ ............................ B60S 1/60; B60R 1/12
[52] U.S. Cl. ..................................... 350/584; 350/608
[58] Field of Search ........................ 350/584, 607–608; 52/171

[56] References Cited

U.S. PATENT DOCUMENTS 3,659,930  5/1972  Groneberg et al. ................. 351/237

FOREIGN PATENT DOCUMENTS 2255937  5/1974  Fed. Rep. of Germany ...... 350/608
8739  1/1981  Japan ................................... 350/584
400445  10/1933  United Kingdom ................ 350/607

Primary Examiner—William H. Punter
Attorney, Agent, or Firm—Alan H. Levine

[57] ABSTRACT

A driving, or outside rear-view, mirror for a motor vehicle including a housing containing a mirror pane. A compressed air circuit provides high pressure air flow to clean the mirror pane and cooperates with a pressure chamber to vary the camber of and hence the field of view offered by the mirror.

1 Claim, 2 Drawing Figures

DRIVING MIRROR FOR MOTOR VEHICLES

This invention relates to a driving mirror for motor vehicles, especially commercial vehicles, including a mirror housing having a mirror pane mounted therein.

Although the usefulness of driving mirrors, i.e., outside rear-view mirrors, for motor vehicles has recently been improved by the provision of adjusting means operated from inside the vehicle, the known mechanical or electrical adjusting means are complex especially when the rear-view mirror is attached at a distance from the body panel, as is the practice with commercial vehicles. Also, such rear-view mirrors, attached to the vehicle in an exposed position as they are, tend to collect dirt quickly, and they are difficult to clean from the driver's seat.

In a broad aspect of the present invention, driving mirrors for motor vehicles, especially commercial vehicles, are improved, insofar as adjusting and cleaning them is concerned, so that they will serve their intended function at all times.

It is a particular object of the present invention to provide an arrangement wherein the mirror housing communicates with an onboard compressed-air circuit.

A driving mirror according to the present invention affords an advantage in that it makes compressed air available as an operating medium at the mirror, eliminating the need for complex and costly mechanical or electrical actuating means and obviating the need for any manual manipulations of the driving mirror. The use of compressed air as a working medium for the driving mirror provides a special advantage also because it minimizes the overall weight of the mirror to reduce the sensitivity of the mirror to vibration, the mirror on commercial vehicles normally being attached to a long cantilever pivot arm.

In an advantageous aspect of the present invention, the compressed air is ducted to the mirror housing through a tubular pivot arm which carries the driving mirror and which is supported on the vehicle body. The pivot arm, which is indispensible on commercial vehicles, can be designed to accommodate a compressed air hose or it can itself be made a pipe to carry the compressed air, which makes for a simple construction. It will, in any case, make the supply of compressed air to the driving mirror a problem requiring no more than modest effort to solve.

In a further advantageous aspect of the present invention, a driver-operated valve is installed in the comprssed air feed line to the mirror to serve whatever actuating function the compressed air is intended to produce on the mirror.

An especially advantageous application for the compressed air as a working medium is the cleaning of the mirror surface. Heretofore, no devices have been known that could be operated from the interior of the vehicle to clean the mirror surface. Instead, the mirror surface which as a result of the unfavorable flow conditions prevailing on a driving mirror, is bound to pick up dirt rapidly, and was necessarily cleaned frequently by hand, which during travel is a difficult job as much as a traffic hazard. In accordance with the present invention, the compressed air available at the mirror is directed tangentially across the mirror surface by means of a nozzle provided on the mirror housing. Such a high energy stream of air will operate to blow the mirror surface clean from moisture, in the form of mist or water drops, and from snow. In a preferred aspect of the present invention, the nozzle is slot-shaped and formed by the beaded edge of the mirror housing; the term "beaded edge", rather than signifying the type of nozzle manufacture, here merely describes its external geometric shape. Accordingly, while the edge of a sheet metal housing may in fact be produced by beading, the term may also include a nozzle-shaped edge formed on a plastic mirror housing.

Another function to be served by the compressed air available at the driving mirror is to vary the field of vision which the driving mirror affords the driver. On trucks and busses, such change in the field of vision is frequently needed because when maneuvering the vehicle the driver will have to observe the immediate vicinity of the vehicle himself, while in normal long-distance travel the field of vision of the mirror should be adjusted to be maximally wide, as it is for passenger cars.

In a further aspect of the present invention, the function of varying the field of vision is served by making the mirror pane of the driving mirror flexible and having it communicate with a pressure chamber provided within the mirror housing to give it a convex or concave camber by controlling the pressure accordingly. The various cambers of the mirror pane narrow (concave mirror pane camber) or widen (convex mirror pane camber) the field of vision of the driver. This eliminates the need for mechanical or electrical pivoting devices to operate a flat mirror pane. Communication between the mirror pane and the pressure chamber to be controlled can be achieved by the mirror pane directly abutting the pressure chamber or the pressure chamber being defined in part by a flexible diaphragm connected to the mirror pane by means of an actuating arm. Conceivably, other types of actuating devices may be used, such as designing the pressure chamber as an air cylinder having a plunger connected to the mirror pane.

Figure 2:
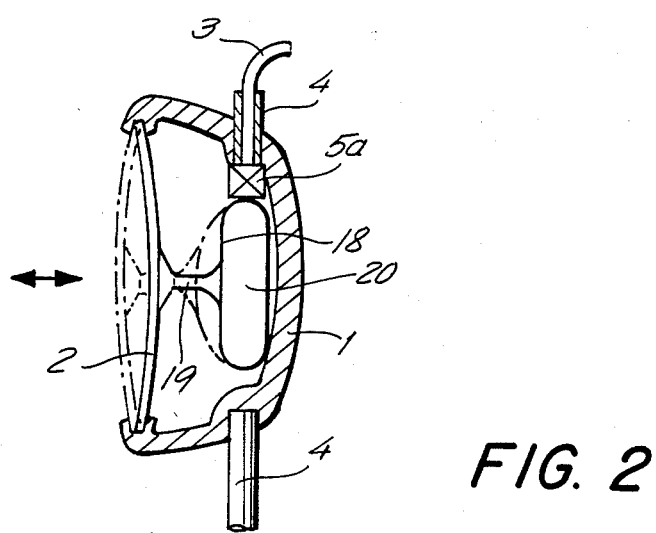

The use of compressed air as a working medium on a driving mirror will now be described more fully with reference to the accompanying drawings, in which:

FIG. 1 is a cross-sectional view of the driving mirror, the mirror surface of which can be cleaned by means of a compressed air jet; and FIG. 2 is a cross-sectional view of a driving mirror, the mirror pane of which has a variable camber controlled by means of compressed air.

The driving mirror illustrated in cross-section in FIG. 1 comprises a mirror housing 1 attached to the vehicle body by means of a tubular pivot arm 4, only the connection portions of which are shown. The mirror housing 1 may be allowed to pivot on the tubular pivot arm 4, and the pivot arm 4 may additionally be allowed pivotal movement on the vehicle. At its lower edge, a mirror pane 2 mounted in the mirror housing 1, is held by the rim of the mirror housing 1, and at its upper edge it is supported on an intermediate web 12 in the mirror housing 1. The upper edge of the mirror housing 1 is a beaded edge 16 shaped to create a slot-shaped nozzle 17 between the mirror pane 2 and the beaded edge 16. Nozzle 17, having a length about equal to the width of the mirror pane, is tangentially directed at the surface of the mirror and communicates with a compressed air chamber 15 which is partitioned off in the mirror housing 1 by means of the intermediate web. An air line 3 is routed through the interior of the tubular pivot arm 4, this line being connected to an onboard compressed air circuit comprising an accumulator 6, further compressed air consumers 7, and a compressor 8. A driver-operated, preferably electrically actuated valve 5 is installed ahead of the point where the air line 3 issues into the pressure chamber 15, the valve being normally closed. When valve 5 is positioned to allow the free passage of air, the air flows through the air lines 3 and into the compressed air chamber 15 and then through the slot-shaped nozzle 17. The high energy jet of compressed air issuing from the slot-shaped nozzle 17 blows the mirror surface clean.

The driving mirror illustrated in FIG. 2 in cross-section includes a mirror housing essentially comparable to that of FIG. 1. This also applies to the retention of the mirror housing 1 on a pivot arm 4, and to the supply of compressed air through a compressed air line 3 in the pivot arm 4.

Unlike the embodiment of FIG. 1, the driving mirror of FIG. 2 is provided with a flexible mirror pane 2 held along its edges in the mirror housing 1. Provided inside the mirror housing 1 is a pressure chamber 20 defined in part by a flexible diaphragm 18. The diaphragm 18 is connected to the rear of the mirror pane 3 by an actuating arm 19. In a starting position (shown in solid line in FIG. 2) the flexible mirror pane 2 exhibits a small amount of concave curvature, with the pressure chamber 20 being under normal pressure. When a previously closed valve 5a in the air feed line 3 to the pressure chamber is opened, air flows into the pressure chamber, causing the pressure in the chamber to rise and the diaphragm 18 to balloon as shown by the dot-dash line. Via actuating arm 19, the flexible mirror pane 2 is thus urged outwards into a convex curvature. The field of vision of the driving mirror has now been changed from narrow to wide. A reverse change in mirror curvature back to the concave starting position is achieved by depressurizing the pressure chamber preferably by shifting the valve 5a into another actuating position, depressurizing conceivably being aided by the mirror pane 2 being suitably preloaded.

In an alternative design, the relatively small pressure chamber of FIG. 2 can be enlarged by involving the entire interior of the mirror housing 1 as a pressure chamber, the pressure chamber then on one side being defined directly by the mirror pane 2. This would eliminate the need for the actuating arm 19.

The applications of compressed air as a working medium, as shown in FIGS. 1 and 2, can naturally be combined such that the driving mirror simultaneously incorporates a compressed air cleaning device as shown in FIG. 1 and a compressed air adjusting device for the mirror pane as shown in FIG. 2. In a final aspect of the present invention, it will be little trouble to incorporate some heating device into the driving mirror, or into a driving mirror as shown in FIG. 1 or 2, making the air-operated mirror adjusting feature, as well as the mirror surface cleaning feature, operable also at temperatures below freezing.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A driving mirror for a motor vehicle, comprising:

a mirror housing having an upper beaded edge, an intermediate web within the housing defining, together with the upper part of the housing, a compressed air chamber, an air feed line for bringing compressed air to the chamber, a valve mounted on the web for controlling the flow of compressed air from the feed line into the chamber, and a mirror pane mounted within the housing, the upper portion of the mirror pane being secured to the web in a position so that its outer face is spaced from the beaded edge of the housing so as to define a slot-like nozzle between the beaded edge and the mirror pane, the nozzle communicating with the compressed air chamber and being shaped to direct compressed air from the chamber tangentially over the outer face of the mirror.

* * * * *